United States Patent [19]
Tang et al.

[11] 4,415,776
[45] Nov. 15, 1983

[54] TELEPHONE MUSIC-ON-HOLD DEVICE

[76] Inventors: Robin K. L. Tang, 13 D 514-3 Tung-hwa S. Rd., Taipei, Taiwan; Donald C. L. Tang, 11120 Candlelight La., Potomac, Md. 20854

[21] Appl. No.: 255,272

[22] Filed: Apr. 17, 1981

[51] Int. Cl.³ .............................................. H04M 1/00
[52] U.S. Cl. ............................... 179/81 R; 179/99 R; 179/99 H
[58] Field of Search ....................... 179/2 B, 6.01, 6.2, 179/81 R, 99 H, 99 LC, 99 R

[56] References Cited

U.S. PATENT DOCUMENTS

| | | | |
|---|---|---|---|
| 1,937,673 | 12/1933 | Spencer, Jr. | 179/2 B |
| 3,246,082 | 4/1966 | Levy | 179/99 H X |
| 3,794,774 | 2/1974 | Kemmerly et al. | 179/81 R |
| 3,872,261 | 3/1975 | Shinoi et al. | |
| 3,909,553 | 9/1975 | Marshall | 179/81 R X |
| 3,965,308 | 6/1976 | Jones et al. | 179/81 R X |
| 3,985,976 | 10/1976 | Cowpland et al. | |
| 4,011,413 | 3/1977 | Phillips | 179/99 H X |
| 4,056,695 | 11/1977 | Angner et al. | 179/99 H |
| 4,066,847 | 1/1978 | Giordano | |
| 4,090,038 | 5/1978 | Biggs | 179/81 R X |
| 4,149,042 | 4/1979 | Balzer et al. | 179/99 H |
| 4,219,701 | 8/1980 | Feiner | 179/99 H |
| 4,243,844 | 1/1981 | Waldman | 179/99 H X |
| 4,267,586 | 5/1981 | Uchino et al. | |
| 4,326,276 | 4/1982 | Scott, Jr. | |

FOREIGN PATENT DOCUMENTS 2915774  10/1980  Fed. Rep. of Germany .... 179/81 R

*Primary Examiner*—G. Z. Rubinson
*Assistant Examiner*—Keith E. George
*Attorney, Agent, or Firm*—Cushman, Darby & Cushman

[57] ABSTRACT

A telephone music device adapted to be inserted within the hollow portion of a telephone handset. The device draws power directly from the telephone line and requires no external power supply. When the handset is in a upright position, as normally utilized for a conversation, the telephone music device is electrically disconnected from the telephone circuit. However, when the handset is laid down such as on a table, the telephone music device becomes electrically interconnected with the telephone circuit. It draws power therefrom and generates a musical melody which is coupled to the telephone line. Alternate embodiments can be clipped to the handset or base of a modular telephone.

14 Claims, 8 Drawing Figures

FIG. 3
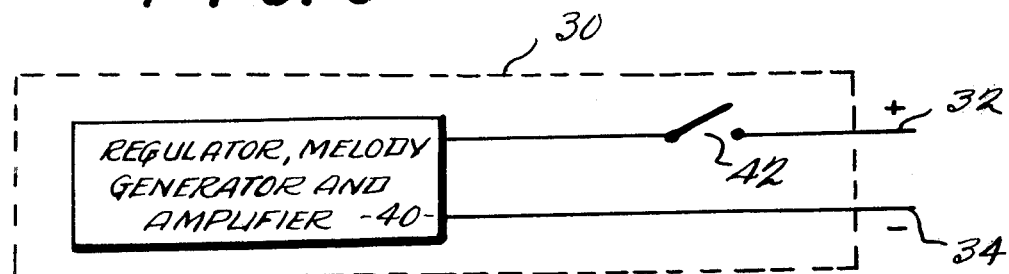
FIG. 4
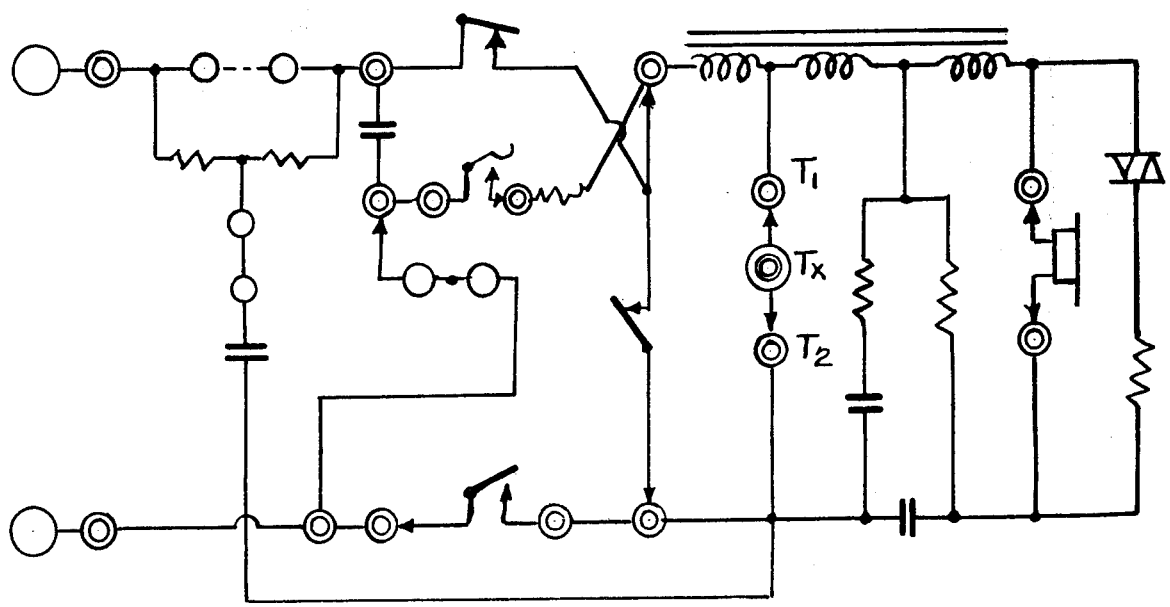
FIG. 5

TELEPHONE MUSIC-ON-HOLD DEVICE

BACKGROUND OF THE INVENTION

The present invention relates to devices used for providing music for a telephone caller placed on "hold".

Many telephone subscribers, and particularly business establishments having multiple telephone lines answered by a single operator, must place calling parties on "hold" at one time or another. Some of these telephone subscribers provide music on the telephone line so that a customer placed on "hold" will know that he is still on line and perhaps not feel that he has been abandoned by the called party.

Music on hold is provided by various types of apparatus. One arrangement plays a pre-recorded audio tape continuously. When a calling party is placed on hold, the telephone line is automatically switched to an output of the tape system so that the tape plays directly into the phone line. A similar system couples a received radio signal or commercial music service signal onto the telephone line. Other known music on hold apparatus use a device intended to sit near the telephone. These devices include a cradle in which the telephone handset is placed when a calling party is to be put on hold. There is no direct electrical connection between the telephone line and the music device. Rather, the music device provides an audio signal that coupled into the mouthpiece portion of the handset when the handset is placed in the cradle. Generally such devices are spring actuated when the handset is placed in the cradle. These devices can produce music mechanically, such as with a spring driven music box or electronically through a speaker. The electronic devices require a power source.

Known systems being quite complex, bulky and expensive, are generally used only by large commercial establishments. They are considered impractical for residential use. To date, there is no known telephone music device that is simple and inexpensive enough for residential use and that is adaptable for easy connection to telephones not having a push-button hold switching system.

SUMMARY OF THE INVENTION

Therefore the present invention provides a telephone music device that is easily connected to any telephone even those not having a "hold" button and that is suitable for residential telephone use. The telephone music device of the present invention is fabricated as a single module of sufficiently small size to be inserted into the hollow portion of a telephone headset. The module includes two lead wires issuing therefrom for interconnection with the two terminal screws provided on a modular interconnect element at the mouthpiece end of the handset. Music is generated electronically and coupled directly into the telephone line. The music is not produced as an audio signal to be detected by a telephone transducer element.

The telephone music device includes a regulator power supply for generating a source of power directly from the telephone line with which it is interconnected and without the need for any external power supply or batteries. It also includes a melody generator for generating a musical melody and an amplifier for amplifying the musical melody and coupling it directly to the telephone line. Also included within the module is a gravity switch for connecting and disconnecting the other circuit components of the telephone music device from the telephone line as a function of the positional orientation of the telephone handset.

Typically, the telephone music device will be installed within the handset such that when the handset is held upright as in normal telephone conversation, the telephone music device is disconnected from the telephone line. In this position, the device neither draws power from the telephone line nor generates any music.

However, when the handset is layed down on a table such that it is parallel to the ground, the gravity switch interconnects the telephone music device, with the telephone line. When the telephone device is so interconnected, power is drawn from the telephone and a melody is generated and coupled into the telephone line. Thus, a caller hears music through the phone line.

If during a telephone conversation, a party must leave the telephone to get information or fetch a pencil and paper, merely placing the telephone on a surface so that it lies flat causes a melody to be generated. This melody would be coupled through the phone link to the other party to the conversation. Lifting the phone handset again to its upright position disconnects the device from the telephone line turns off the melody generator.

Alternate embodiments of the telephone music device permit clip-on attachment to a modular telephone handset or to the base of a modular telephone.

BRIEF DESCRIPTION OF THE DRAWINGS

The invention will be better understood from the following detailed description and appended claims when read in conjunction with the drawings wherein:

FIG. 3 is a simplified block diagram of the telephone music device according to the present invention;

FIG. 4 is a more detailed block diagram of the telephone music device according to the present invention;

FIG. 5 is a detailed schematic diagram of a typical telephone circuit showing the telephone line interconnection terminals to which the telephone music device of the present invention is electrically connected via terminals of the telephone handset;

DETAILED DESCRIPTION OF THE PREFERRED EMBODIMENT

Figure 1A:
FIGS. 1A and 1B illustrate the use of the telephone music device according to the present invention.

Referring now to FIG. 1, the use of the telephone music device according to the present invention is illustrated. In FIG. 1a, a person is shown holding a handset 10 of a telephone in the normal position for use during a telephone conversation. In this position, the telephone music device is electrically disconnected from the telephone circuit. It does not draw power from the telephone circuit and does not provide any music on the telephone line.

Figure 1B:
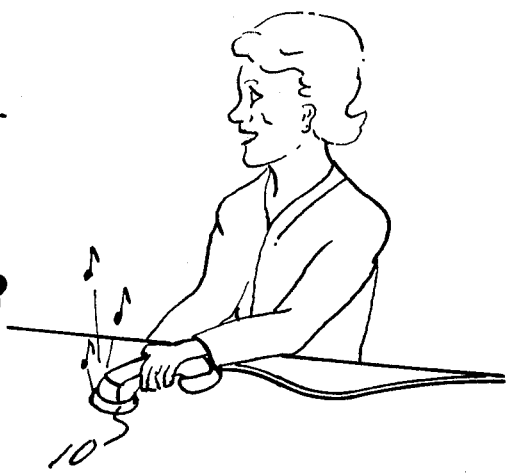

However, as shown in FIG. 1B, when handset 10 is laid down on a table, the telephone music device becomes electrically interconnected with the telephone line. In this position, the music device draws power from the telephone line and generates a musical melody which is impressed onto the telephone line.

Figure 2:
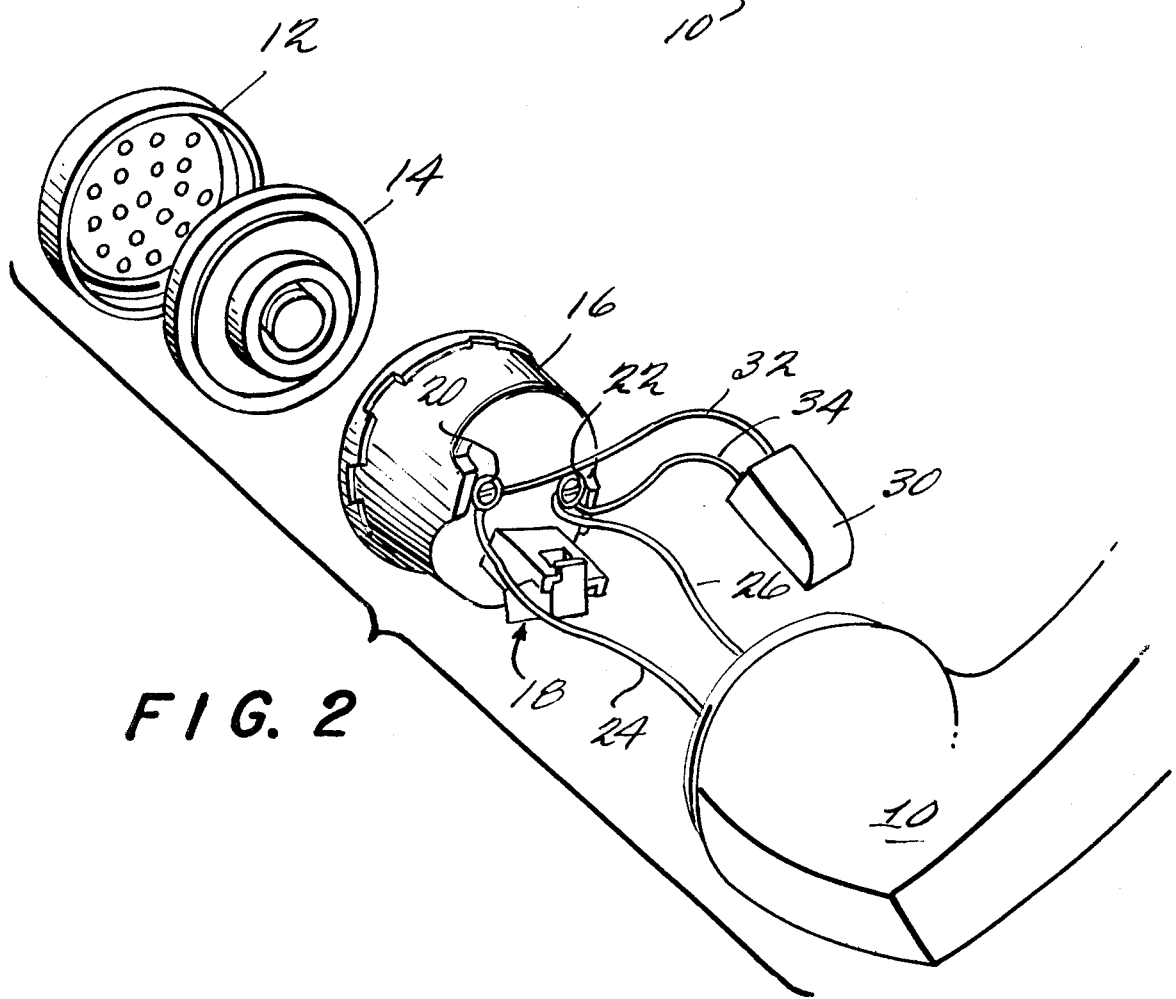
FIG. 2 is an exploded view of the mouthpiece portion of the telephone handset showing the installation of the telephone music device therein.

Referring now to FIG. 2 there is shown an exploded view of the mouthpiece end of a telephone handset 10. Removing the plastic cover 12 from the mouthpiece end of handset 10 exposes a transducer element 14 which is electrically interconnected with the telephone circuit via a modular interconnect element 16.

Modular interconnect element 16 includes a line interconnect portion 18 through which a telephone line cord couples handset 10 to the body portion of a telephone. Interconnect element 16 includes two screw terminals 20 and 22 through which the element is coupled via wires 24 and 26 to a similar interconnect element in the earpiece portion (not shown) of handset 10. In essence, wires 24 and 26, running between the earpiece portion (not shown) and mouthpiece portion of handset 10 places the mouthpiece and earpiece transducer elements of handset 10 in parallel across a telephone line.

The telephone music device of the present invention is generally referred to by reference numeral 30 and includes a pair of lead wires 32 and 34. To install telephone music device 30 into the telephone, the modular interconnect element 16 is removed from the mouthpiece portion of handset 10 to expose a hollow region (not shown) between the mouthpiece portion and earpiece portion of the handset. Telephone music device 30 is fabricated in a single module that is sufficiently small to be inserted into their hollow portion. The module is inserted with a predetermined positional orientation with respect to the handset as will be later discussed.

Lead wires 32 and 34 from telephone music device 30 are coupled to terminals 20 and 22 in parallel with wires 24 and 26 running through the handset to the earpiece portion thereof. Connection of lead wires 32 and 34 to terminals 20 and 22 places telephone music device 30 electrically in parallel with both the diaphragm 14 in the mouthpiece portion of handset 10 and with a similar diaphragm in the earpiece portion of the handset.

Referring now to FIG. 3 there is shown a block diagram of telephone music device 30 according to the present invention. Telephone music device 30 includes electrical circuits 40 comprising a regulator power supply for obtaining power from the telephone line, a melody generator for generating a musical melody and an amplifier for amplifying the musical melody and impressing it into the telephone line. Device 30 further includes a gravity switch 42, typically a mercury switch. The regulator, melody generator, and amplifier 40 are fabricated on a single printed circuit board. These elements, along with the switch 42 are packaged as a single unit and encapsulated as a module with leads 32 and 34 issuing therefrom as shown in FIG. 2.

Referring now to FIG. 4 there is shown a more detailed block diagram of the telephone music device 30 according to the present invention. In this Figure, element 40 is expanded to show its three principcal components. Element 40 includes a regulator power supply 50, a melody generator 52, and an amplifier 54. Gravity switch 42 is coupled in series with lead wire 32 coupled to terminal 20.

Specifically, a first terminal of switch 42 is connected to lead 32 and a second terminal of the switch is interconnected with a power input of regulator power supply 50 and the output of amplifier 54.

When switch 42 is closed, the power input of regulator supply 50 is coupled to the second terminal switch 42 so that it receives power from the telephone line. Regulator 50 can be any regulating power supply designed to generate a constant voltage from the power supply line. As one non-limitative example, regulator 50 might include one or more Zener diodes and a capacitor filter circuit to supply a constant 1.5 volts for powering a melody generator integrated circuit.

A common line 56 from regulator 50 is coupled directly to lead 34. The power output line of regulator 50 is coupled to the power input of a melody generator 52. Melody generator 52 can be any suitable melody generating integrated circuit. For example, melody generator 52 could be a Seiko melody integrated circuit (CMOS), series 7910-20-30. Of course, other suitable melody generators could be substituted if they have voltage levels compatible with the telephone line voltages. Melody generator 52 provides one or more melodies each comprising a plurality of musical notes arranged in a predetermined sequence. The melody generated by melody generator 52 is amplified by an amplifier 54 and coupled to the second terminal of gravity switch 42. Thus, when gravity switch 42 is closed, not only is power supplied to the input of regulator 50 but also melody signals from amplifier 54 are generated and coupled to line 32.

When the telephone music device is encapsulated, gravity switch 42 is installed such that when the device is in a first positional orientation, the switch is closed and when it is in a second positional orientation, the switch is open. Thus, if the telephone music device 30 is installed with a certain predetermined positional orientation within the hollow portion of handset 10, gravity switch 42 will be open when the handset is held upright (see FIG. 1A) and will be closed when the handset is laid down on a table (see FIG. 1B).

Referring now to FIG. 5 there is shown a detailed schematic diagram of a typical telephone. Within the telephone are two terminals T1 and T2 which represent the electrical interconnection points for telephone music device 30. In essence, terminals T1 and T2 are electrically coupled to terminals 20 and 22 via a line cord (not shown) coupling the base of the telephone with modular interconnect element 16 via its interconnect portion 18. Of course, the telephone music device 30 can be used with other telephones. The circuit shown in FIG. 5 is merely an illustrative example.

Figure 6:
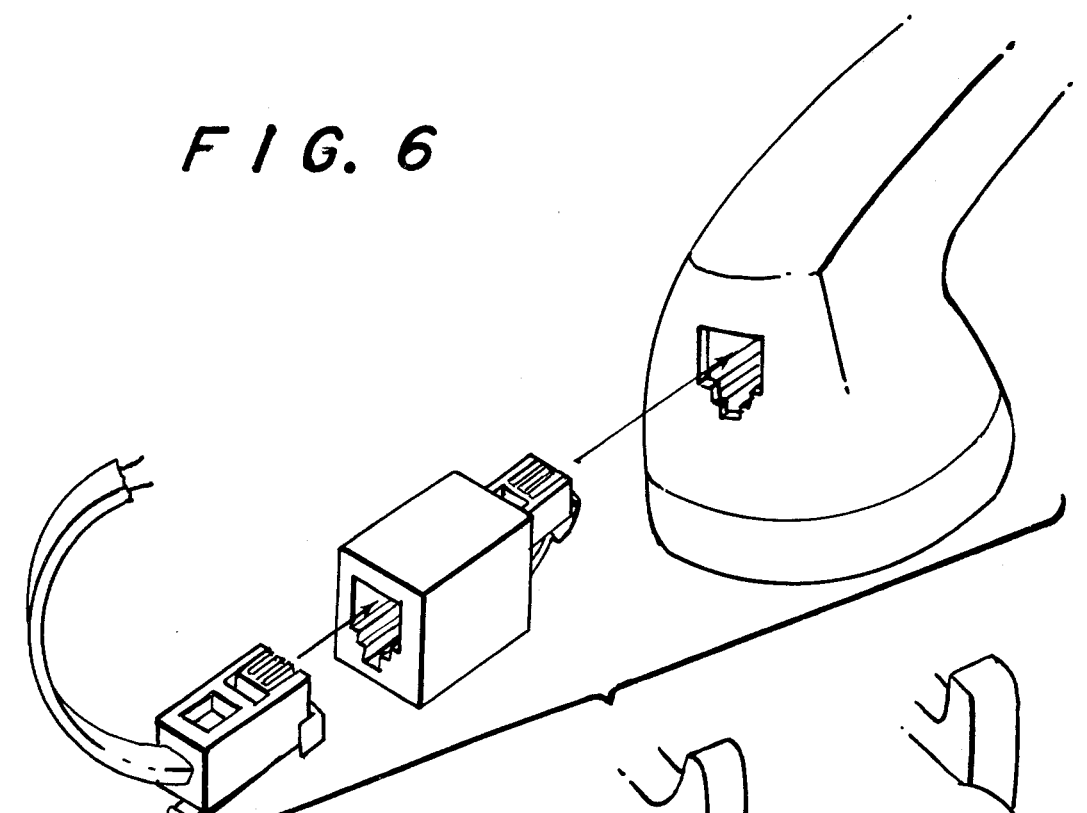
FIG. 6 illustrates an alternate embodiment of the telephone music device adapted for clip-on attachment to a handset of a modular telephone.

Referring now to FIG. 6 there is illustrated an alternate embodiment of the telephone music device according to the present invention. This embodiment uses the same circuit as shown in FIGS. 3 and 4. However, the circuitry, including the gravity switch, is packaged as an integral unit having interconnects that are plug compatible with the clip connectors of a modular telephone. The music device can be easily attached between the line cord, connecting the telephone line with the handset, and the handset itself. The line cord is removed from the handset and is instead plugged into the unit. The unit is then plugged into the handset. The gravity switch is positioned within the device so as to achieve the desired result as shown in FIG. 1.

Figure 7:
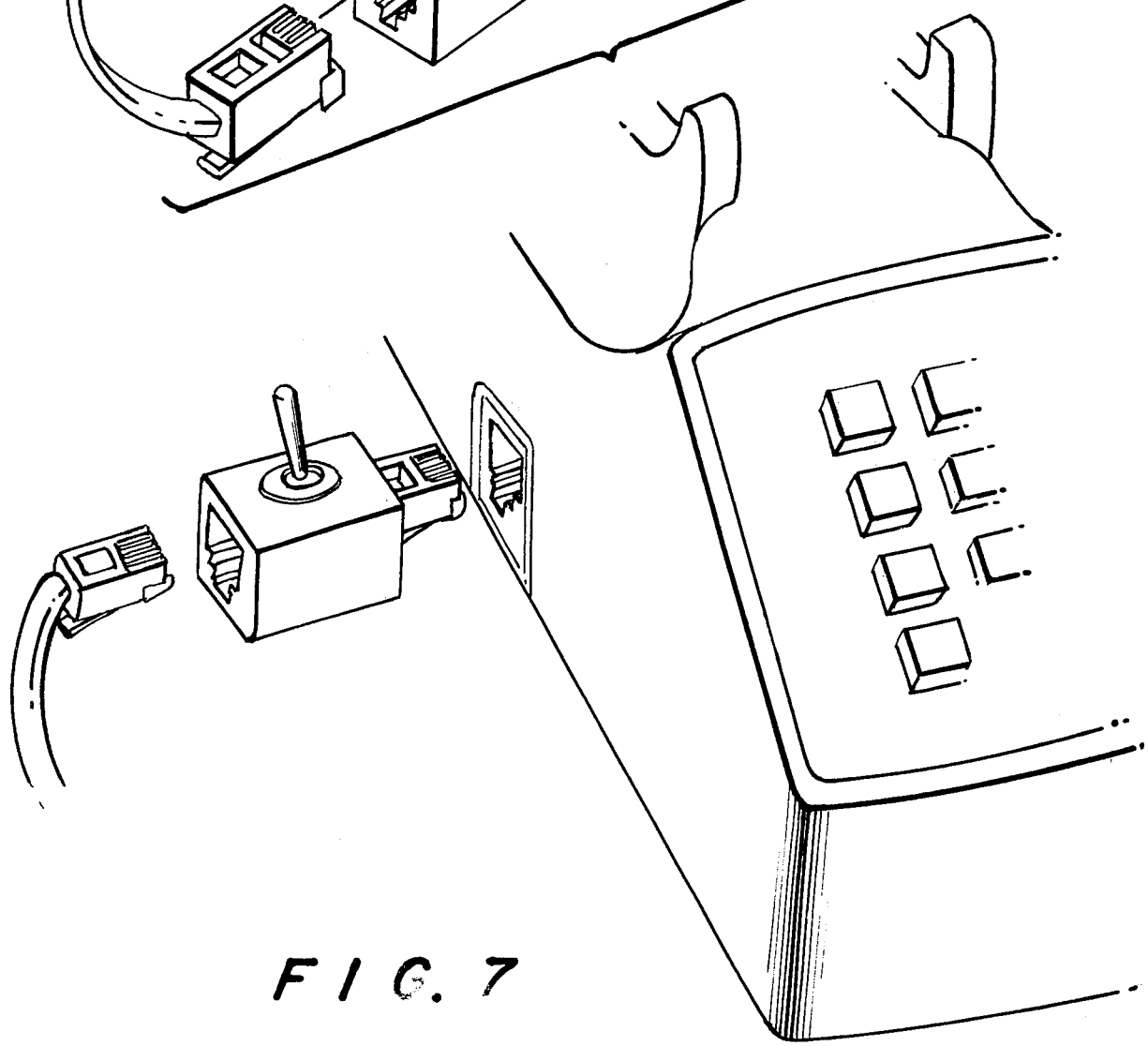
FIG. 7 illustrates an alternate embodiment of the telephone music device adapted for clip-on attachment to the body of a modular telephone.

Referring now to FIG. 7 there is illustrated an alternate embodiment of the telephone music device according to the present invention. This embodiment is similar to the embodiment shown in FIG. 6. However it is "packaged" to be clipped to the base of a telephone at the point normally coupled to the line cord running to the handset. In this embodiment only, the gravity switch is replaced by a conventional switch. Music on hold is not fully automatic as in the other embodiments, but rather must be user actuated.

While the invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

I claim:

1. A telephone music-on-hold device for generating music and coupling it onto a telephone line comprising:
   a regulator adapted to be coupled to a telephone line, for drawing power from the telephone line and supplying regulated power;
   a melody circuit powered by said regulator, for generating a multi-note musical melody; and
   an amplifier for amplifying the musical melody and coupling it to the telephone line,
   the regulator, melody circuit, and amplifier being constructed as a single unit of sufficiently small size to be inserted into a hollow portion of a telephone handset and having only two lead wires associated therewith for connection to terminals of the telephone handset.

2. A telephone music device according to claim 1 further including a gravity switch for (a) electrically connecting the music device to the telephone line when the handset is in a first positional orientation and (b) electrically disconnecting the music device from the telephone line when the handset is in a second positional orientation.

3. A telephone music device according to claim 2 wherein said gravity switch is a mercury switch.

4. A two terminal music-on-hold device for use in a telephone handset; comprising:
   first and second lead wires for connection with two terminals of a telephone handset;
   gravity switch means, having a first terminal coupled to said first lead wire, and a second terminal, for providing a short circuit when said switch is in a first positional orientation and an open circuit when said switch means is in a second positional orientation;
   a regulator having power input, common, and power output terminals, the power input terminal being coupled to said second terminal of said gravity switch means and said common terminal being coupled to said second lead wire;
   a melody generator circuit having a power input coupled to the power output terminal of the regulator, a common terminal coupled to said common terminal of said regulator and to said second lead wire and a melody output; and
   an amplifier having an input coupled to said melody output of said melody generator and an output coupled to said second terminal of said gravity switch means,
   whereby when said music device is installed within a telephone handset and said handset is oriented such that said gravity switch is in said first positional orientation, the power input of said regulator and the output of said amplifier are electrically interconnected with said first terminal of said telephone handset and a melody is generated and coupled to said terminals, and when said telephone handset is oriented such that said gravity switch is in said second positional orientation, the power input of said regulator and the output of the amplifier are disconnected from the first terminal and no music is generated.

5. A telephone music device according to claim 4 wherein said gravity switch means is a mercury switch.

6. A telephone music device according to claim 4 or 5 wherein all components except for the lead wires are encapsulated as a single unit with said lead wires issuing therefrom.

7. A telephone music-on-hold apparatus, comprising:
   a regulator power supply for drawing power from a telephone line and supplying a regulated voltage;
   a CMOS melody generator powered by said regulator power supply for generating a musical melody; and
   a gravity switch for interconnecting said regulator power supply and said melody generator with a telephone line,
   said regulator power supply, melody circuit, and gravity switch being formed as an integral unit adapted for insertion into a hollow portion of a telephone handset and having two lead wires for electrical interconnection with telephone line terminals within said handset, said gravity switch effecting electrical connection or disconnection of said regulator and melody generator from said telephone line as a function of the positional orientation of said handset.

8. A telephone music device according to claim 7 wherein said gravity switch is a mercury switch.

9. A telephone music-on-hold device for generating music and coupling it onto a telephone line comprising:
   a regulator adapted to be coupled to a telephone line, for drawing power from the telephone line and supplying regulated power;
   a melody circuit powered by said regulator, for generating a multi-note musical melody; and
   an amplifier for amplifying the musical melody and coupling it to the telephone line, the regulator, melody circuit, and amplifier being constructed as an integral unit adaptable for clip attachment to a handset of a modular telephone so as to be electrically in circuit across the handset lines between the handset and body of the telephone; and
   a gravity switch for (a) electrically connecting the music device to the telephone line when the handset is in a first positional orientation and (b) electrically disconnectng the music device from the telephone line when the handset is in a second positional orientation.

10. A telephone music device according to claim 9 wherein said gravity switch is a mercury switch.

11. A music-on-hold device for use with a modular telephone handset; comprising:
    a gravity switch having first and second terminals providing a short circuit when said switch is in a first positional orientation and an open circuit when said switch is in a second positional orientation;
    a regulator having power input, common, and power output terminals, the power input terminal being coupled to said second terminal of said gravity switch;

a melody generator circuit having a power input coupled to the power output terminal of the regulator, a common terminal coupled to said common terminal of said regulator and a melody output;

an amplifier having an input coupled to said melody output of said melody generator and an output coupled to said second terminal of said gravity switch;

a connector arrangement adapted for clip connection with the handset of a telephone which couples the first terminal of said gravity switch and the common terminals of said regulator and melody generator across the telephone line wherein when said music device is installed at a telephone handset and said handset is oriented such that said gravity switch is in said first positional orientation, the power input of said regulator and the output of said amplifier are electrically interconnected with said first terminal of said telephone handset and a melody is generated and coupled to said terminals, and when said telephone handset is such that sold gravity switch is oriented in said second positional orientation, the power input of said regulator and the output of the amplifier are disconnected from the first terminal and no music is generated.

12. A telephone music device according to claim 11 wherein said gravity switch is a mercury switch.

13. A telephone music-on-hold apparatus, comprising:

a regulator power supply for drawing power from a telephone line and supply a regulator voltage;

a melody generator powered by said regulator power supply for generating a musical melody; and a gravity switch for interconnecting said regulator power supply and said melody generator with a telephone line, said regulator power supply, melody circuit, and gravity switch being formed as an integral unit adapted for attachment to the handset of a telephone, said gravity switch effecting electrical connection or disconnection of said regulator and melody generator from said telephone line as a function of the positional orientation of said handset.

14. A telephone music device according to claim 13 wherein said gravity switch is a mercury switch.

* * * * *